Figure 1:
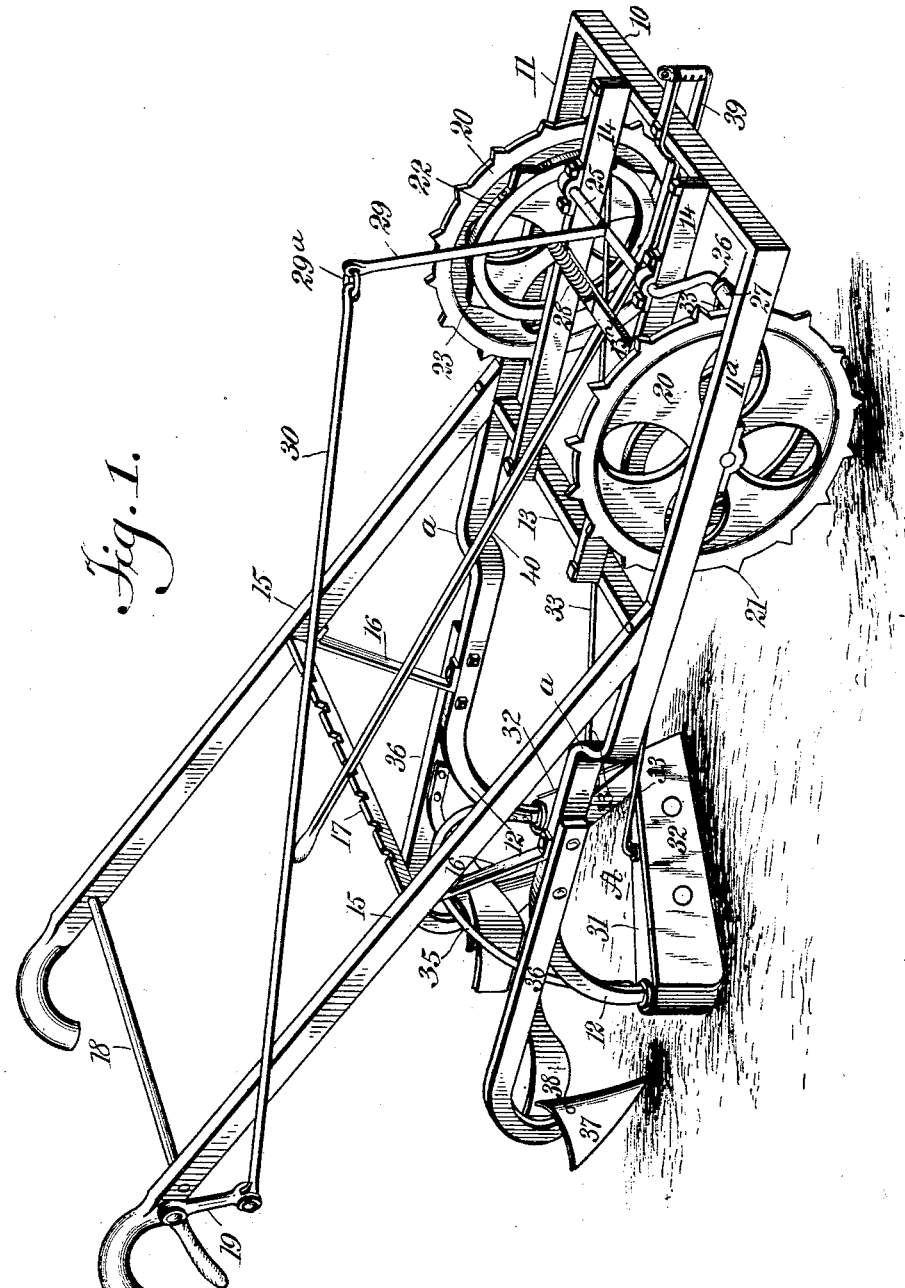

No. 733,237. PATENTED JULY 7, 1903.
H. F. MACKEY.
COTTON CHOPPER.
APPLICATION FILED JAN. 16, 1903.
NO MODEL. 2 SHEETS—SHEET 1.

WITNESSES:

INVENTOR
Henry F. Mackey
BY
ATTORNEYS.

No. 733,237. PATENTED JULY 7, 1903.
H. F. MACKEY.
COTTON CHOPPER.
APPLICATION FILED JAN. 16, 1903.
NO MODEL. 2 SHEETS—SHEET 2.
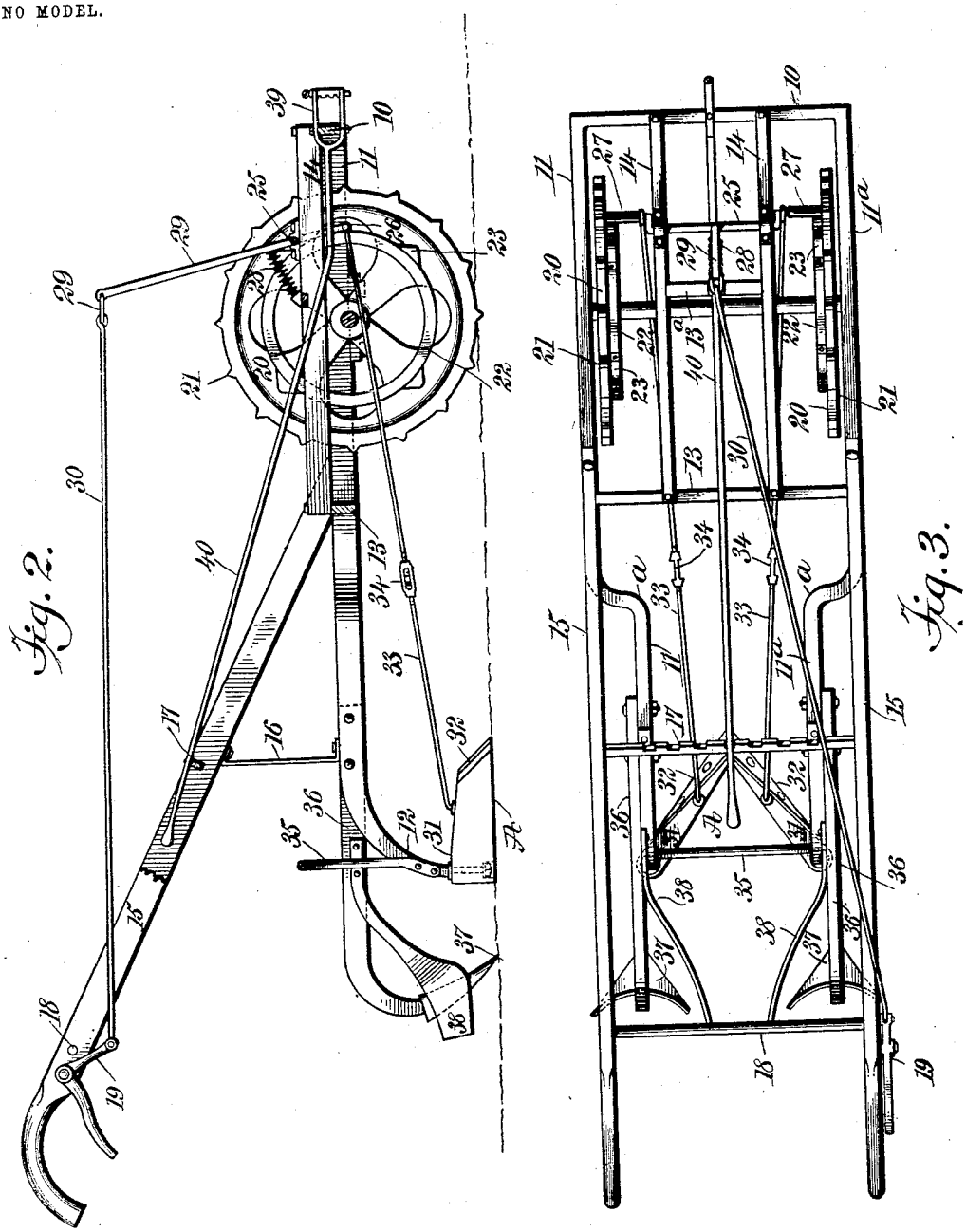
WITNESSES:
INVENTOR
Henry F. Mackey
BY
ATTORNEYS.

No. 733,237.　　　　　　　　　　　　　　　　　　　　Patented July 7, 1903.

UNITED STATES PATENT OFFICE.

HENRY FILLMORE MACKEY, OF CRYSTAL SPRINGS, MISSISSIPPI.

COTTON-CHOPPER.

SPECIFICATION forming part of Letters Patent No. 733,237, dated July 7, 1903.

Application filed January 16, 1903. Serial No. 139,296. (No model.)

*To all whom it may concern:*

Be it known that I, HENRY FILLMORE MACKEY, a citizen of the United States, and a resident of Crystal Springs, in the county of Copiah and State of Mississippi, have invented a new and Improved Cotton-Chopper, of which the following is a full, clear, and exact description.

The purpose of the invention is to provide a cotton-chopper having independent blades normally engaging in a manner to form a V scraper, the point of the V facing forward, which blades in their combined or V arrangement practically scrape the surplus plants from the rows instead of removing them by a rotary digging or hoe action, as is customary.

Another purpose of the invention is to provide a means for intermittently separating the blades in an automatic manner by the rotation of the supporting-wheels of the machine, whereby at such time to leave a predetermined number of plants standing, and, furthermore, to provide means under the direct control of the operator for separating the scraper-blades at any time.

A further purpose of the invention is to provide a means for shifting the clevis, so that the direction of the draft of the team may be changed at will or as rendered advisable by the character of the ground.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved machine. Fig. 2 is a central longitudinal section through the machine, and Fig. 3 is a plan view of the machine.

The frame of the machine consists, preferably, of opposing side pieces 11 and 11$^a$, which between their forward and rear ends are preferably curved inward, as shown at $a$, thus rendering the space between the rear portions of the said side pieces narrower than between their forward portions. The rear ends 12 of the said side pieces 11 and 11$^a$ are curved downwardly in direction of the ground and more or less in a forward direction.

The side pieces 11 and 11$^a$ are connected at the front by a cross-bar 10 and between their ends by a cross-bar 13, which may be termed a "rear cross-bar," and upon the said rear cross-bar 13 and forward cross-bar 10 longitudinal beams 14 are secured, and said beams are connected by an intermediate cross-bar 13$^a$.

Handle-bars 15 are secured to the side bars 11 and 11$^a$, extending, preferably, from a point just forward of the rear cross-bar 13 upwardly and rearwardly, and these handle-bars 15 are supported between their ends by suitable standards 16. The handle-bars 15 are connected between their ends by a rack-bar 17 and preferably are connected at their upper ends by a cross bar or rod 18, while upon the outer face of the right-hand handle-bar a lever 19 is fulcrumed, preferably of the elbow or bell-crank type.

It will be observed that the forward section of the frame is more or less of rectangular formation, and this forward section is supported by wheels 20, the said wheels being provided with independent axles or trunnions suitably journaled in the side pieces 11 and 11$^a$ about centrally of the forward or rectangular portion of the frame. These supporting-wheels 20 are preferably provided with peripheral spurs 21, so that they will take hold in the ground. Furthermore, each supporting-wheel 20 is provided upon its inner face usually with a ring 22, secured thereto in any approved manner, and lugs 23 are attached to said ring, being detachably connected thereto by screws or their equivalents, the rings being provided to that end with series of threaded apertures. These lugs 23 may be integral with the rings 22 and are what may be termed "trip-lugs" and have their forward and rear faces oppositely beveled, so that the said lugs are more or less triangular in cross-section; but I desire it to be understood that the trip-lugs 23 may be of any size and secured to the wheels 20 in any approved manner and that the angularity of their contact-surfaces may be changed. In fact, such surfaces may be convex, if desired.

A crank-shaft 25 is provided for the forward portion of the rectangular portion of the frame of the machine, the crank portion of the said shaft being journaled in suitable bearings carried by the intermediate longitudinal bars 14 of the frame, and the terminal arms of the crank-shaft extend downward outside of the said longitudinal bar. Each terminal section of the crank-shaft 25 is provided with a horizontal extension 26, and each of said extensions carries a friction-roller 27, mounted to turn loosely thereon. These friction-rollers 27 are normally held in the path of the trip-lugs 23 on the supporting-wheels 20 by means of a spring 28, attached to the intermediate cross-bar 13$^a$ and to an upright 29, extending from the central portion of the crank-shaft 25, and the upper end of the said upright 29 is connected by a link 29$^a$ with a rod 30, which rod in turn is connected with the bell-crank lever 19, so that by operating the bell-crank lever 19 the crank-shaft may be rocked forwardly and the friction-rollers 27 be carried out of the path of the trip-lugs 23. The link 29$^a$ admits of the upright 29 being moved backward and forward in the general operation of the machine without causing the bell-crank lever 19 to interfere with the hand grasping a handle. These trip-lugs and the crank-shaft are adapted to operate a device A for removing surplus plants. This device consists, preferably, of arms 31, pivotally attached at their rear or heel portions to the rear end sections 12 of the side pieces 11 and 11$^a$ of the frame, and the said arms 31 are made to approach one another more or less closely at their forward ends and are also rendered more or less tapering, their forward extremities being much thinner transversely than their rear or heel portions. Each of the said arms 31 is provided with a blade 32, attached thereto in any approved manner, preferably in such manner that the blades may be removed to be sharpened or replaced when broken. These blades have their forward ends more or less tapered, and the blades are located at the outer faces of the said arms 31.

The blades 32 normally engage at their forward ends, thus forming a V cutter or scraper, and said blades enter the ground to a desired extent and cut all before them while they are in their closed relation; but when the blades 32 are separated at their forward ends, which is done by moving the supporting-arms outward, the machine will pass over groups of plants without disturbing them, providing a means whereby the plants may be thinned out and others be left standing. The blades are moved outward by the action of the trip-lugs 23 on the crank-shaft 25, and this is accomplished by pivotally connecting the supporting-arms 31 of the blades 32 with the downwardly-extending terminal portions of the crank-shaft 25 by rods 33, preferably made in two sections, the said sections being connected by turnbuckles 34, so that the said blades may be made to separate to a greater or less extent. Such separation of the blades takes place each time that the friction-rollers 27 engage with the trip-lugs 23 on the supporting-wheels 20, and as soon as such engagement ceases the crank-shaft is drawn to its normal position by the spring 28, and the two blades 32 are instantly brought together at their forward ends to scrape or remove other plants in their path.

It will be observed that through the medium of the connecting-rod 30 and the lever 19 the operator may hold the blades 32 separated for any desired length of time.

The side pieces 11 and 11$^a$ of the frame are connected at their rear portions by a rod 35, and at the rear portion of each side piece 11 and 11$^a$ a rearwardly-extending beam 36 is removably secured, and these beams are curved downwardly and forwardly at their rear ends, forming shanks to receive cultivator blades or shovels 37, which follow the cutting-blades 32 and cultivate the plants that are left standing in a row. Each beam 36 is provided with an attached fender 38, the fenders being secured to the inner faces of the beams, and they extend down at their inner sides of the shovels 37.

A clevis 39 is pivoted to the forward cross-bar 10 of the frame, and said clevis is provided with an attached lever-handle 40, which extends rearwardly between the handle-bars 15 within reach of the operator and to an engagement with the rack-bar 17. Thus by means of the lever bar or handle 40 connected with the clevis, the clevis may be turned to one side or to the other, enabling the operator to place the draft to the right or to the left and enable the team to walk on the upper side of a row, or on a hillside, or encircle the row.

Having thus described my invention, I claim as new and desire to secure by Letters Patent—

1. The combination in a cotton-chopper comprising a two-wheeled frame, and handle-bars connected with the latter, of horizontally-disposed arms pivoted at the rear part of the frame and normally converging at their forward ends, a spring-actuated rock-shaft mounted in the frame forwardly of the wheels, and provided with crank members at the ends thereof, a single rod connection between each of said members and one of the said mentioned pivoted arms, means carried by the wheels for intermittently actuating said crank members, to rock said shaft to temporarily separate said arms, and means extending from said rock-shaft to within reach of the operator, for separating the arms at will, said arms being provided with blades.

2. The combination in a cotton-chopper comprising a two-wheeled frame, and handle-bars connected with the latter, of horizontally-disposed arms pivoted at the rear part of the frame and normally converging at their forward ends, said arms being provided with blades, a rock-shaft mounted in the frame forwardly of the wheels, and provided with crank members at the ends thereof, a single rod connection between each of said members and one of the said mentioned pivoted arms, rings on the inner faces of the wheels, having peripheral projections for intermittently actuating said crank members, to rock said shaft to temporarily separate said arms and their blades, a spring-actuated upright on the central portion of the rock-shaft, a rod extending from said upright to within reach of the operator, and means whereby said parts may be operated to separate said pivoted arms at will, each of said rod connections being provided with means for regulating the extent of such separation.

3. In a cotton-chopper, the combination with a frame, wheels supporting the same, triangular lugs secured to the inner faces of the said wheels, a rock-shaft mounted on the frame, rollers carried by the terminal portions of the rock-shaft for engagement with the said lugs, an extension from the rock-shaft, a spring connected with said extension and with the frame, serving to hold the said rollers in the path of the said lugs, handle-bars connected with the frame, a lever carried by the handle-bars, and a connection between the lever and the extension of the crank-shaft, of horizontal arms pivoted at the rear portion of the frame, which arms are oppositely disposed and inclined in direction of each other at their forward portion, blades removably secured to the said arms, and links connecting the said arms with the crank-arms of the crank-shaft, as set forth.

In testimony whereof I have signed my name to this specification in the presence of two subscribing witnesses.

HENRY FILLMORE MACKEY.

Witnesses:
JOHN L. APPEL,
W. C. SCOTT.